(12) United States Patent
Kobayashi

(10) Patent No.: US 10,886,810 B2
(45) Date of Patent: Jan. 5, 2021

(54) BRUSHLESS MOTOR AND WINDING METHOD FOR STATOR

(71) Applicant: SHINANO KENSHI KABUSHIKI KAISHA, Nagano (JP)

(72) Inventor: Hiroyuki Kobayashi, Nagano (JP)

(73) Assignee: SHINANO KENSHI KABUSHIKI KAISHA, Nagano (JP)

( * ) Notice: Subject to any disclaimer, the term of this patent is extended or adjusted under 35 U.S.C. 154(b) by 555 days.

(21) Appl. No.: 15/722,453

(22) Filed: Oct. 2, 2017

(65) Prior Publication Data

US 2018/0123418 A1 May 3, 2018

(30) Foreign Application Priority Data

Oct. 6, 2016 (JP) .................. 2016-197874

(51) Int. Cl.
| | |
|---|---|
| H05K 3/46 | (2006.01) |
| H02K 3/46 | (2006.01) |
| H02K 1/16 | (2006.01) |
| H02K 3/12 | (2006.01) |
| H02K 15/02 | (2006.01) |
| H02K 1/14 | (2006.01) |
| H02K 15/095 | (2006.01) |

(52) U.S. Cl.
CPC .............. *H02K 3/46* (2013.01); *H02K 1/146* (2013.01); *H02K 1/165* (2013.01); *H02K 3/12* (2013.01); *H02K 15/022* (2013.01); *H02K 15/024* (2013.01); *H02K 15/095* (2013.01)

(58) Field of Classification Search
CPC ............ H02K 3/46; H02K 3/12; H02K 1/146; H02K 1/165; H02K 15/022; H02K 15/024; H02K 15/095
See application file for complete search history.

(56) References Cited

U.S. PATENT DOCUMENTS 5,610,464 A * 3/1997 Asano .................... H02K 29/03
310/156.45

FOREIGN PATENT DOCUMENTS

| JP | 2007-060800 | | 3/2007 |
|---|---|---|---|
| JP | 2010-017057 | | 1/2010 |
| JP | 2010017057 A | * | 1/2010 |
| JP | 2015-089327 | | 5/2015 |

OTHER PUBLICATIONS

European Search Report dated Feb. 22, 2018 in European Application No. 17 19 3667.

* cited by examiner

Primary Examiner — Jue Zhang
(74) Attorney, Agent, or Firm — Stephen J. Weyer, Esq.; Stites & Harbison, PLLC

(57) ABSTRACT

To provide a brushless motor in which a coil winding can be wound uniformly even when there is a difference in the distance between tooth tips of a plurality of pole teeth disposed in the circumferential direction of an annular part of a stator core so as to project in the radial direction. A guide core in which the distance between adjacent tooth tips of pole teeth is uniform and the tooth tips are symmetric with respect to the shaft lines in the radial direction is laminated integrally with a stator core in which a plurality of pole teeth is disposed in the circumferential direction of an annular part so as to project in the radial direction, and the distance in the circumferential direction between adjacent tooth tips is not uniform.

2 Claims, 5 Drawing Sheets

Enlargement view of Part Q

BRUSHLESS MOTOR AND WINDING METHOD FOR STATOR

CROSS-REFERENCE TO RELATED APPLICATION

This application is based upon and claims the benefit of priority of the prior Japanese Patent Application No. 2016-197874, filed on Oct. 6, 2016, and the entire contents of which are incorporated herein by reference.

TECHNICAL FIELD

The present invention relates to a brushless motor used in, for example, HVAC (heating, ventilation, and air conditioning) devices and a winding method for a stator.

BACKGROUND ART

The structure of a stator and a rotor of, for example, an outer rotor type three-phase DC brushless motor will be described with reference to FIG. 9. The structure of a stator 1 will be described. A laminated core in which electromagnetic steel plates are laminated with each other is used as a stator core 4. A plurality of pole teeth 4a projects radially outside from an annular core body. A coil (not illustrated) is formed around each of the pole teeth 4a. The stator core 4 is press-bonded and assembled to the outer periphery of a bearing housing (not illustrated). A bearing is fitted into the bearing housing.

A rotor 8 assembled integrally by swaging a cup-shaped rotor yoke 12 with respect to a rotor hub fixed to one end of a rotor shaft. Annular rotor magnets 13 multipole-magnetized in the circumferential direction are assembled to the inner peripheral surface of the rotor yoke 12. After the stator 1 is assembled, the rotor 8 is fitted by passing the rotor shaft through the bearing of the bearing housing. At this time, assembly is performed so that the pole teeth 4a of the stator core 4 face the rotor magnets 13.

When the rotor is held in a constant position in the state in which the motor is not excited, the holding torque (cogging torque) needs to be increased. In this case, the pole teeth of the stator core need to face the magnetic poles of the rotor magnets on a one-to-one basis. However, since the disposition of the stator core so as to face the rotor magnets does not necessarily form a magnetic circuit, there is proposed a technique for increasing the holding torque by preparing an additional core other than the stator core and causing the pole teeth to face the magnetic poles of the rotor magnets on a one-to-one basis (JP-A-2015-89327).

SUMMARY OF INVENTION

Technical Problem

In contrast, it is also possible to improve the cogging torque by increasing the number of pole teeth facing the magnetic poles of the rotor magnets by changing the distance between tooth tips of the pole teeth of the stator core without increasing the number of components of the stator and making the pole teeth of the stator core asymmetric with respect to the shaft lines in the radial direction. For example, when a magnet wire is wound around a pole tooth of the stator core using a flyer-driven wire winding machine, a coil is formed in an open slot by disposing a main former movable in the radial direction of the pole tooth and a side former covering the adjacent pole teeth, winding the magnet wire around the pole tooth by rotating a flyer for holding a nozzle, and winding the magnet wire from the root end part (annular core back part) of the pole tooth to the tip sequentially by moving the main former in the radial direction each time the wire is wound around the pole tooth.

However, since the tooth tips of the pole teeth are asymmetric with respect to the shaft lines in the radial direction in the laminated core formed by punching an electromagnetic steel plate annularly, the spaces, formed around the pole teeth, that introduce the magnet wire to the open slot become nonuniform. Specifically, when the magnet wire is wound around the pole tooth, since a space is generated between the tooth tip and the side plates and the center former rattles and becomes unstable as the flyer of the wire winding machine rotates, the magnet wire may not be wound uniformly around the pole tooth and a defect such as a wire break due to increase in the tension of the magnet wire may be caused. Accordingly, the winding speed of the wire winding machine needs to be reduced, so the productivity may be reduced and the defective ratio of products may be increased.

Solution to Problem

The invention addresses these problems with an object of providing a winding method for a stator that can increase the productivity and reduce the defective ratio by improving a brushless motor and a winding method for a stator so that coil windings can be wound uniformly even in a stator core in which the distance between tooth tips of a plurality of pole teeth disposed in the circumferential direction of the annular part so as to project in the radial direction is not uniform.

The invention has the following structure to achieve the above object.

There is provided a brushless motor including a stator having a stator core provided with a plurality of stator pole teeth around which coils are formed and a rotor having a rotor shaft rotatably supported via a bearing, the rotor shaft being provided at the center of a rotor yoke having a plurality of rotor magnets facing the stator pole teeth, in which a guide core is laminated integrally with the stator core, the guide core having a plurality of pole teeth provided with a plurality of tooth tips symmetric with respect to shaft lines in a radial direction, a distance between the adjacent tooth tips being uniform, the stator core having the stator pole teeth in a circumferential direction of an annular part so as to project in the radial direction, the stator pole teeth having a plurality of tooth tips, a distance between the adjacent tooth tips in the circumferential direction being not uniform.

In the stator core which has the pole teeth disposed in the circumferential direction of the annular part so as to project in the radial direction and in which the distance between adjacent tooth tips in the circumferential direction is not uniform, the distance between tooth tips of the pole teeth is relatively large or small. However, since the guide core which has the pole teeth provided with the tooth tips symmetric with respect to the shaft lines in the radial direction and in which the distance between adjacent tooth tips is uniform is integrally laminated, the distance between the adjacent tooth tips of the pole teeth when the coil is formed using the wire winding machine based on the guide core becomes uniform. Accordingly, even when the distance between the tooth tips of the pole teeth of the stator core is different, since the tooth tips of the guide core are fixed using the side plates of the wire winding machine, coils can be formed uniformly around the pole teeth and the productivity can be improved because winding work can be performed efficiently, thereby reducing the defective ratio.

In this case, since the stator core includes at least one of pole teeth having the tooth tips symmetric with respect to the shaft lines in the radial direction and pole teeth having the tooth tips asymmetric with respect to the shaft lines in the radial direction, the distance in the circumferential direction between the adjacent tooth tips is assumed to be not uniform. That is, coils can be formed uniformly around the pole teeth in both a stator core in which the distance in the circumferential direction of adjacent tooth tips is not uniform because there are differences in the lengths in the circumferential direction of the tooth tips although the tooth tips are symmetric with respect to the shaft lines in the radial direction and a stator core in which the distance in the circumferential direction of adjacent tooth tips is not uniform because pole teeth having symmetric tooth tips are mixed with pole teeth having asymmetric tooth tips.

Preferably, a pair of guide cores is laminated with and assembled integrally to both ends in a lamination direction of the stator core.

Accordingly, when a winding is wound, it is possible to perform winding work while preventing the center former and the stator core from moving together by clamping the tooth tip of the pole tooth of the guide core using both sides in the circumferential direction of a pair of plates included in the center former of the wire winding machine.

If the guide core is assembled integrally to the stator core by laminate-pressing electromagnetic steel plates in which the pole teeth project in the radial direction from the annular parts formed annularly, the guide core can be easily assembled when the stator core is laminate-pressed, thereby improving the productivity.

Preferably, the stator core has a plurality of first pole teeth, a plurality of second pole teeth, and a plurality of third pole teeth disposed in the circumferential direction so as to project in the radial direction from the annular part, each of the first pole teeth has a tooth tip symmetric with respect to the shaft line in the radial direction, each of the second pole teeth and each of the third pole teeth are adjacent to one of the first pole teeth in the circumferential direction and have tooth tips asymmetric with respect to the shaft lines in the radial direction, a distance between the tooth tips of each of the second pole teeth and each of the third pole teeth is smaller than a distance between the tooth tip of each of the first pole teeth and the tooth tip of each of the second pole teeth and a distance between the tooth tip of each of the first pole teeth and the tooth tip of each of the third pole teeth.

Accordingly, even when using a stator in which the distance between the tooth tips of each of the second pole teeth and each of the third pole teeth is smaller than the distance between the tooth tip of each of the first pole teeth and the tooth tip of each of the second pole teeth and the distance between the tooth tip of each of the first pole teeth and the tooth tip of each of the third pole teeth, coils can be formed uniformly around the pole teeth because the guide core is provided.

A winding method for a stator includes a first process of preparing a composite core in which a guide core having a plurality of pole teeth is assembled integrally to a stator core having a plurality of pole teeth disposed in a circumferential direction of an annular part so as to project in a radial direction so that the pole teeth and the pole teeth are superimposed on each other, the pole teeth of the guide core having tooth tips symmetric with respect to shaft lines in a radial direction, a distance between the adjacent tooth tips being uniform, the pole teeth of the stator core having a plurality of tooth tips, a distance between the adjacent tooth tips being not uniform, a second process of clamping both sides in the circumferential direction of the tooth tip of the guide core and clamping both ends in a lamination direction of the pole teeth around which a coil is formed at a predetermined position in the radial direction so as to cover the pole teeth adjacent to both sides with a side former when the composite core is fixed to a rotatable support table and the pole teeth is positioned by a center former of a wire winding machine, a third process of rotating a rotary cylindrical body while a magnet wire is held in a nozzle provided in the rotary cylindrical body, causing the magnet wire to enter an open slot through a clearance formed between the center former and the side former, and winding the magnet wire around the pole tooth, a fourth process of repeatedly winding the magnet wire around the pole teeth by further rotating the rotary cylindrical body while moving the center former in the radial direction of the pole tooth by one pitch until the coil is formed around the pole teeth, and a fifth process of repeatedly applying the second to fourth processes to a next pole tooth of the stator core by rotating the support table at a predetermined angle while moving the center former away from the pole tooth until the coil is formed for all of the pole teeth.

When a pole tooth around which a coil is formed is positioned by the center former of the wire winding machine, both sides in the circumferential direction of the tooth tip of the guide core are clamped, both ends in the lamination direction of the pole tooth are clamped at a predetermined position in the radial direction, and the pole teeth adjacent to both sides are covered with the side former.

Accordingly, even if the distance between tooth tips of the pole teeth is large or small because the stator has at least one of pole teeth having symmetric tooth tips and pole teeth having asymmetric tooth tips with respect to the shaft lines in the radial direction, it is possible to form coils uniformly while preventing the center former of the winding machine from moving together during winding operation of winding work by clamping both sides in the circumferential direction of the tooth tips of the guide core. In addition, the clearance through which the magnet wire enters the open slot of the pole tooth becomes constant and coils can be formed uniformly around the pole teeth. Accordingly, the productivity of winding work for an asymmetric core is improved and the defective ratio can be reduced.

The center former is provided with a pair of side plates and the side plates clamp and guide both ends in the circumferential direction of the tooth tips of the guide core so that the center former and the composite core can be positioned to prevent them from moving together during winding work.

Since the magnet wire having passed though the nozzle is caused to enter the open slot through the clearance between the side former and the side plates and is introduced to the vicinity of the pole teeth while being guided by the center former, the magnet wire can be evenly wound around the pole teeth by introducing the magnet wire to the open slot of the pole teeth through the clearance having a uniform width formed between the side former and the side plates.

Advantageous Effects of Invention

In the brushless motor, even in the stator core in which the distances between the tooth tips of the plurality of pole teeth disposed in the circumferential direction of the annular part so as to project in the radial direction is different, coil windings can be formed uniformly and motor characteristics are not reduced.

In addition, in the winding method for the stator, the productivity can be improved and the defective ratio can be reduced by winding coil windings uniformly regardless of whether the distance between the tooth tips of the pole teeth of the stator core is the same or different.

DESCRIPTION OF EMBODIMENTS

An embodiment of a brushless motor according to the invention will be described together with a winding method for a stator with reference to the attached drawings. In the embodiment, descriptions are given using an outer rotor type three-phase DC brushless motor as an example. It should be noted that the motor may be an inner rotor type motor as long as the motor has a stator core and pole teeth around which coils are formed.

Figure 1:
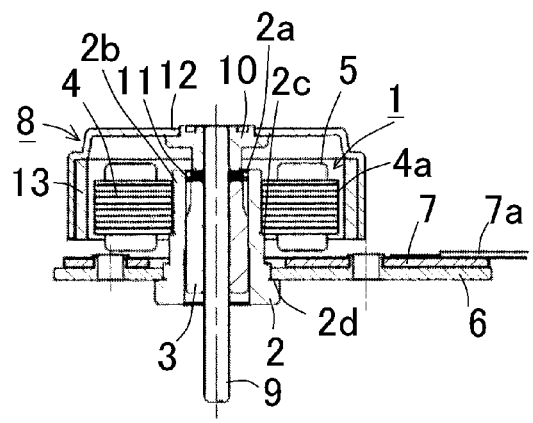
FIG. 1 is an explanatory diagram illustrating a cross section of an outer rotor type DC brushless motor taken along a shaft direction.

The schematic structure of an outer rotor type three-phase DC brushless motor will be described with reference to FIG. 1. The structure of a stator 1 will be described. A cylindrical metal oil retaining bearing 3 made of sintered metal is assembled concentrically to a shaft hole 2a of a housing 2 formed in a cylinder. A stator core 4 is bonded and fixed to a stepped part 2c in a contact manner along one end part 2b and the outer peripheral part of the housing 2. The stator core 4 is a laminated core in which coils 5 are formed around pole teeth 4a1, 4a2, and 4a3 (see FIG. 2) projecting radially toward the outer periphery in plan view. A pair of guide cores 14 (see FIG. 4) is integrally laminated with both ends in the lamination direction of the stator core 4.

In addition, a large diameter stepped part 2d is formed in the outer periphery on the other side of the housing 2 and a mount plate 6 is assembled to the stepped part 2d by press-fitting or swaging. A motor board 7 is fixed to the mount plate 6 and the motor board 7 is provided with a sensor board (not illustrated) on which hall elements and the like are mounted. Wiring 7a for supplying power is connected to the motor board 7.

Next, the structure of a rotor 8 will be described with reference to FIG. 1. A rotor hub 10 formed by cutting brass or the like is fixed to one side of a rotor shaft 9 by press-fitting. A cup-shaped rotor yoke 12 is assembled integrally to the rotor hub 10 by swaging. The rotary motion of the rotor 8 is supported by the metal oil retaining bearing 3 inserted into the cylindrical hole of the housing 2 through which the rotor shaft 9 passes. The vertical load of the rotor 8 is supported by a washer 11 provided between the rotor hub 10 and the metal oil retaining bearing 3.

The rotor yoke 12 is made of a magnetic substance. Annular rotor magnets 13 are assembled to the inner peripheral surface of the rotor yoke 12. The annular rotor magnets 13 are alternately multipole-magnetized in the circumferential direction by the north pole and the south pole. The length in the shaft direction of the rotor magnets 13 is larger than the length in the shaft direction of pole teeth 4a of the stator core 4. After the stator 1 is assembled, the rotor 8 is inserted so that the rotor shaft 9 passes through the metal oil retaining bearing 3. At this time, the assembly is performed so that the pole teeth 4a of the stator core 4 face the rotor magnets 13. The rotor 8 is assembled so that the rotor magnets 13 and the stator pole teeth 4a facing the rotor magnets 13 are magnetically attracted each other and the rotor shaft 9 is rotatably supported by the housing 2 via the metal oil retaining bearing 3.

Next, the form of the stator 1 will be described in detail with reference to FIGS. 2 to 5.

Figure 2:
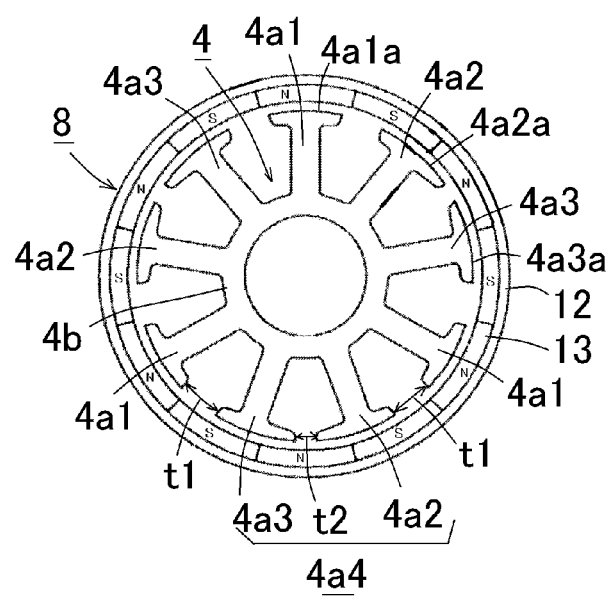
FIG. 2 is an explanatory diagram illustrating the disposition structure of a stator core and a rotor in FIG. 1.

In FIG. 2, the rotor magnets 13 of the rotor 8 are alternately magnetized in the circumferential direction by the north pole and the south pole and the total number of magnetic poles is 12. In addition, the total number (number of poles) of pole teeth of the stator core 4 is nine (9 slots).

A total of nine poles (nine slots) of pole teeth 4a provided on the stator core 4 have the following shapes. As illustrated in FIG. 2, the first pole tooth 4a1 faces the rotor magnet 13 so as to be aligned with one (for example, the north pole) of the magnetic poles of the rotor magnet 13 and is formed symmetrically with respect to a shaft line in the radial direction. In addition, the second pole tooth 4a2 and the third pole tooth 4a3 adjacent to the first pole tooth 4a1 in the circumferential direction are formed asymmetrically with respect to shaft lines in the radial direction and a clearance t2 between the second pole tooth 4a2 and the third pole tooth 4a3 is smaller than a clearance t1 between the first pole tooth 4a1 and the second pole tooth 4a2 and the clearance t1 between the first pole tooth 4a1 and the third pole tooth 4a3 (t1>t2).

Figure 3A:
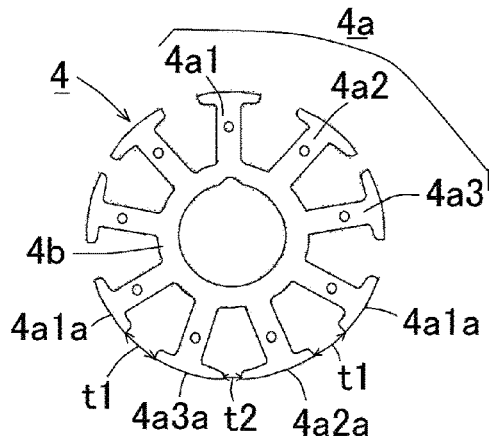
FIG. 3A is a plan view and perspective view of the stator core and FIG. 3B is a perspective view thereof.
Figure 3B:
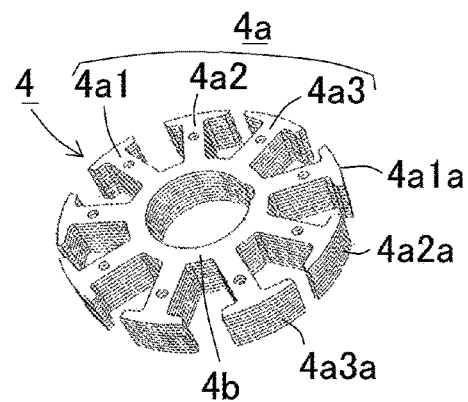

That is, as illustrated in FIGS. 3A and 3B, a tooth tip 4a1a, which is the magnetic flux application surface of the first pole tooth 4a1, is symmetric with respect to a shaft line in the radial direction and faces the north pole of the rotor magnet 13 to exert an attraction force therebetween. In addition, a tooth tip 4a2a, which is the magnetic flux application surface of the second pole tooth 4a2, and a tooth tip 4a3a, which is the magnetic flux application surface of the third pole tooth 4a3, are asymmetric with respect to shaft lines in the radial direction. The tooth tip 4a2a of the second pole tooth 4a2 and the tooth tip 4a3a of the third the pole tooth 4a3 are assumed to be a pseudo second pole tooth 4a4 that is equivalent to the single pole teeth 4a, so that attraction forces are exerted between the pseudo second pole tooth 4a4 and a plurality of rotor magnetic poles (for example, the south pole, the north pole and the south pole) which face the pseudo second pole tooth 4a4 and with which the magnetic flux application surfaces are aligned (see FIG. 2).

In FIG. 2A, when the number of magnetic poles of the rotor magnets 13 is m (m is an integer equal to or more than 2: m=12 in FIG. 4A) and the number of pole teeth of the stator core 4 is P (P is an integer equal to or more than 3: P=9 in FIG. 2), the ratio P/m is 9/12 (=3/4).

However, when the second pole tooth 4a2 and the third the pole tooth 4a3 are assumed to be the pseudo second pole tooth 4a4, since the total number of pole teeth P' of the first pole teeth 4a1 (three teeth) and the pseudo second pole teeth 4a4 (three teeth) is six, the ratio P'/m is 6/12 (=1/2). This can improve cogging torque (holding torque).

Figure 4:
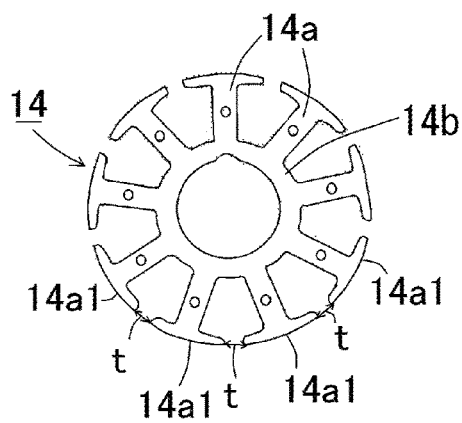
FIG. 4 is a plan view illustrating a guide core.

In addition, the guide cores 14 illustrated in FIG. 4 are laminated with both ends in the lamination direction of the stator core 4. The guide cores 14 are formed of electromagnetic steel plates and have a plurality of pole teeth 14a symmetric with respect to shaft lines in the radial direction so that the pole teeth 14a project in the radial direction from an annular part 14b. Tooth tips 14a1 of the pole teeth 14a are formed symmetrically with respect to the shaft lines in the radial direction and a clearance t between the adjacent tooth tips 14a1 is identical.

Figure 5:
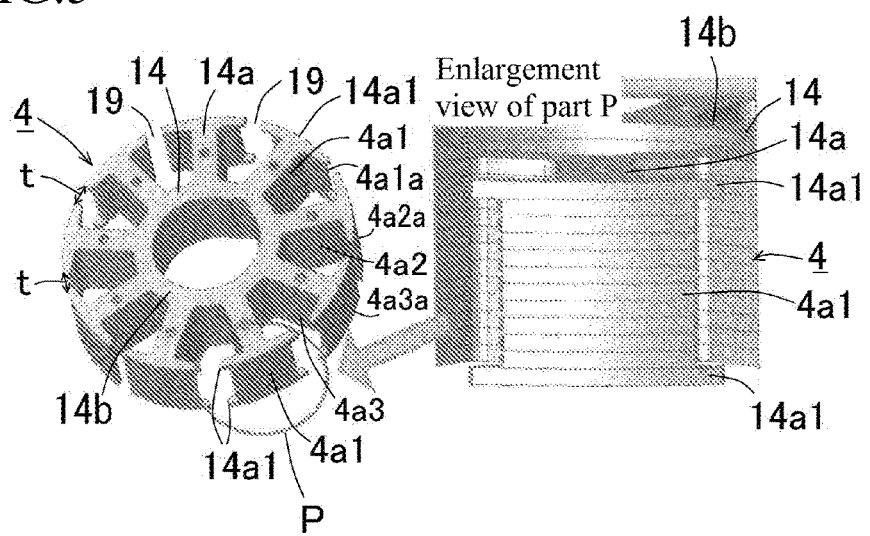
FIG. 5 illustrates a perspective view and a partial enlarged view of the stator core on which a pair of guide cores has been superimposed.

As illustrated in FIG. 5, the guide cores 14 are laminated integrally with both ends in the lamination direction of the stator core 4 (see an enlarged view of P in FIG. 5). Since the pair of guide cores 14 is assembled integrally to the stator core 4 when the laminated core is laminate-pressed, the productivity is improved. As a result, in the stator core 4, the distances (open slots 19) between the tooth tips of the first pole teeth 4a1, the second pole teeth 4a2, and the third pole teeth 4a3 are unified to the clearance t between the tooth tips 14a1 of the adjacent pole teeth 14a of the guide core 14.

As described above, even in the stator core 4 having an asymmetric pole tooth 4a, the distances t (open slot 19) between the tooth tips of all pole teeth 4a are identical. Accordingly, when a magnet wire 18 is introduced to the open slot 19 using a former of a wire winding machine 15 described later, looseness with respect to tooth tips are not caused easily and coils can be formed uniformly around the pole teeth 4a.

Next, the winding method for the stator 1 will be described with reference to FIGS. 6 and 7.

The stator core 4 (composite core) is prepared (see FIG. 5) in which the pair of guide cores 14 having a plurality of symmetric pole teeth 14a disposed in the circumferential direction illustrated in FIG. 4 is assembled integrally to both ends by laminate-pressing in the lamination direction of the stator core 4 having the asymmetric pole teeth 4a including the plurality of first pole teeth 4a1, the plurality of second pole teeth 4a2, and the plurality of third pole teeth 4a3 disposed in the circumferential direction illustrated in FIGS. 3A and 3B so as to project in the radial direction. The number of guide cores 14 may be one or more than one. It should be noted that the guide core 14 is not illustrated in FIGS. 6A and 7A to 7C.

As illustrated in 6A, the magnet wire 18 is wound around the pole teeth 4a of the stator core 4 using the flyer-driven wire winding machine 15. In the stator core 4, the pair of guide cores 14 is laminated integrally with both ends thereof in the lamination direction and the distances between the tooth tips of all pole teeth 4a including the first pole teeth 4a1, the second pole teeth 4a2, and the third pole teeth 4a3 are the clearance t which is the clearance of the pole teeth 14a (see FIG. 5). The stator core 4 is placed on a pair of core stands (support tables) 21 and positioned with an annular part (core back part) 4b clamped from upward and downward. The stator core 4 is rotatably supported while being clamped by the core stands 21.

The wire winding machine 15 has a center former 16a movable in the radial direction of the pole teeth 4a and a pair of side formers 16b covering adjacent pole teeth. The center former 16a has upper and lower former parts 16a1 and 16a2 extending forward and has a constriction in the middle part thereof (see FIG. 7A). A pair of side plates 16c is provided on both sides of the center former 16a. The pair of side plates 16c guides the magnet wire 18 having passed through a nozzle 17 to the open slot 19 via the clearance between the side former 16b and the side plate 16c and introduces the magnet wire 18 to the periphery of the pole tooth 4a. The pair of center formers 16a is disposed concentrically in a cylindrical flyer (rotary cylindrical body) 20 so as to move forward and backward. Since the center former 16a does not rotate even when the flyer 20 rotates, the range in which the center former 16a can move forward and backward in the radial direction is wider than in the side plate 16c. The nozzle 17 for holding the magnet wire 18 is assembled integrally to the outer periphery of the flyer 20. When the flyer 20 rotates, the nozzle 17 for holding the magnet wire 18 also rotates.

An example of a winding method for an asymmetric core using the wire winding machine 15 will be described with reference to FIGS. 5 to 7.

Figure 6A:
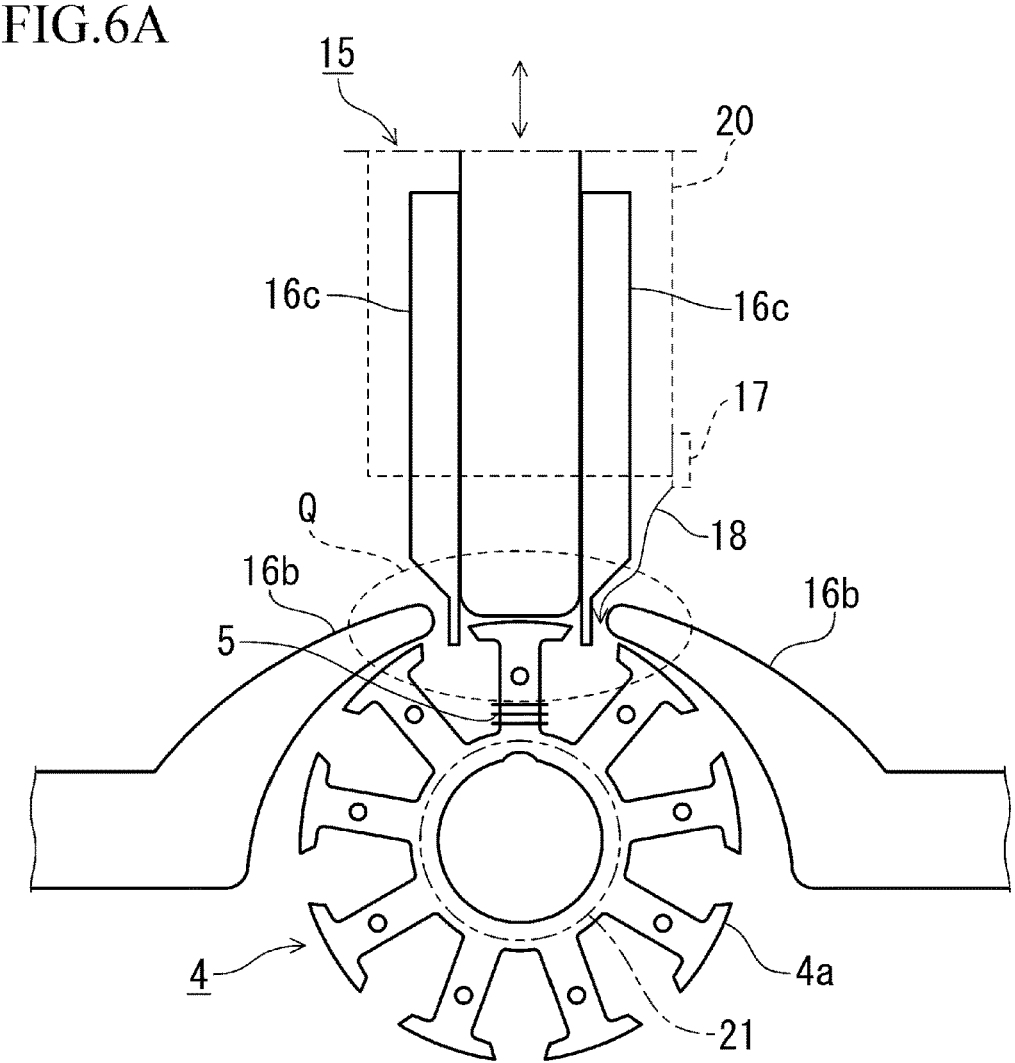
FIG. 6A is a schematic view illustrating the work for winding a magnet wire around the stator core provided with the guide core using a wire winding machine and FIG. 6B is an enlargement of a portion thereof as indicated in FIG. 6A.
Figure 6B:
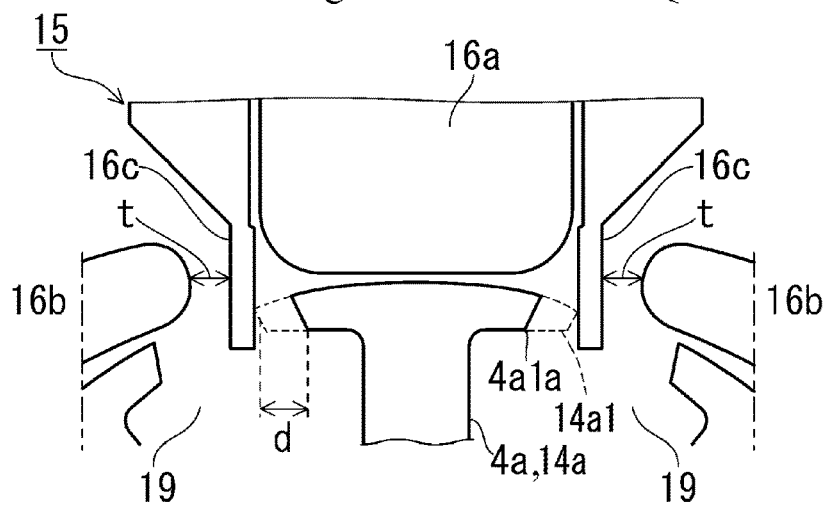
Figure 7A:
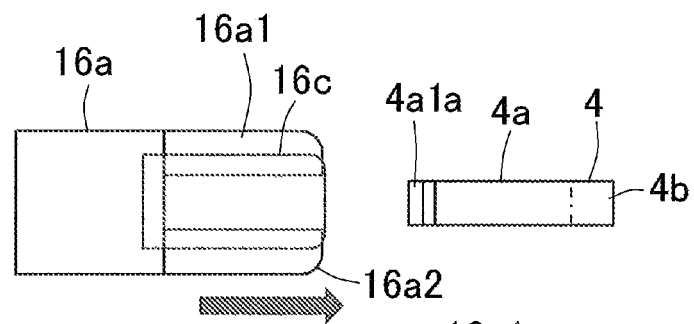
FIG. 7A illustrates the state of a center former that depends on winding operation by the wire winding machine.
Figure 7B:
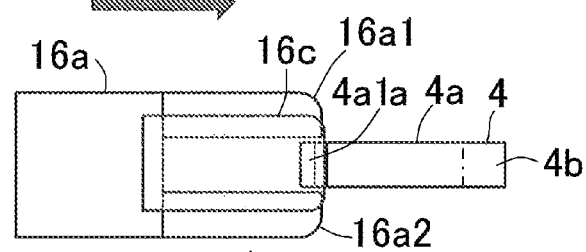
FIG. 7B illustrates the state of a center former that depends on winding operation by the wire winding machine.

As illustrated in FIG. 5, the stator core 4 to which the pair of guide cores 14 has been assembled is prepared (first process) and then the annular part 4b of the stator core 4 is clamped and fixed by the pair of upper and lower core stands 21 as illustrated in FIG. 6A (second process). Specifically, as illustrated in FIG. 7A, the upper and lower former parts 16a1 and 16a2 of the center former 16a of the wire winding machine 15 reach a predetermined position in the radial direction by passing through the tooth tip 4a1a of the pole tooth 4a of the stator core 4 and clamp the pole tooth 4a in the lamination direction. The side plates 16c move forward together with the center former 16a and clamp both ends in the circumferential direction of the tooth tip 14a1 of the pole tooth 14a (see FIG. 6B). In addition, the pole teeth 4a adjacent to both sides of the pole tooth 4a around which the coil 5 is formed are covered with the side formers 16b provided together with the core stands 21 (see FIG. 6A).

The tip of the magnet wire 18 having passed through the nozzle 17 provided in the cylindrical flyer 20 is locked to the core stand 21. As the rotation of the flyer 20 advances, the magnet wire 18 enters the open slot 19 formed between the side plate 16c (center former 16a) and the side former 16b and the magnet wire 18 is wound around the pole tooth 4a while being guided by the center former 16a (third process). When the guide core 14 is absent at this time, if a clearance d is generated at the tooth tip 4a1a of the pole tooth 4a as illustrated in FIG. 6B, the center former 16a or the side plate 16c behaves unstably and rattles due to the rotation of the flyer 20, the clearance t between the side plate 16c and the side former 16b varies, and the coil 5 may be broken because it cannot be wound uniformly. In contrast, when using the guide core 14 (see FIG. 4) having the plurality of pole teeth 14a for which the clearance t of adjacent tooth tips 14a1 is uniform, if the side plates 16c surely clamp both sides in the circumferential direction of the tooth tip 14a1 of the pole tooth 14a, the center former 16a is stable and does not rattle even if the flyer 20 rotates. Accordingly, the magnet wire 18 is introduced into the open slot 19 through the uniform clearance t between the side plate 16c and the side former 16b and can be wound around the pole teeth 4a, 14a with a constant winding diameter (see FIG. 6B).

Figure 7C:
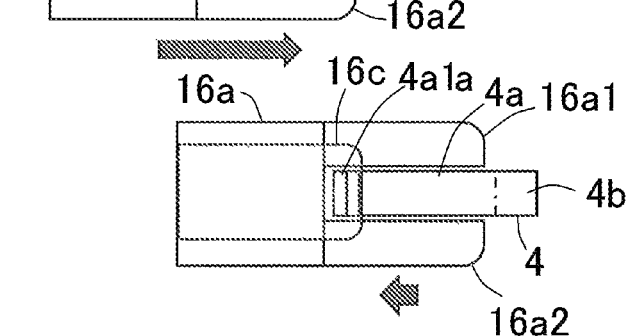
FIG. 7C illustrates the state of a center former that depends on winding operation by the wire winding machine.

When the magnet wire 18 is wound around the pole tooth, as illustrated in FIG. 7C, the center former 16a is moved by one pitch toward radially outside of the pole tooth and the flyer 20 is further rotated to wind the magnet wire 18 around the pole tooth 4a. By rotating the flyer 20 for holding the nozzle 17, winding the magnet wire 18 around the pole tooth 4a, and moving the center former 16a radially outside by one pitch each time the magnet wire 18 is wound around the pole tooth 4a, the magnet wire 18 is wound sequentially from the root end part (annular part 4b) of the pole tooth 4a to the tooth tip 4a1a to form the coil 5 in the open slot 19 (fourth process).

Next, the center former 16a is moved away from the pole tooth 4a (for example, U-phase pole tooth 4a) around which the magnet wire 18 has been wound, the pair of upper and lower core stands 21 is rotated at a predetermined angle (for example, 120 degrees) with the stator core 4 clamped by the core stands 21, and the second to fourth processes described above are repeatedly applied to the next pole tooth 4a (for example, U-phase pole tooth 4a). The above processes are applied until the coils 5 equivalent to the U-phase, the V-phase, and the W-phase are formed around all pole teeth 4a1, 4a2, and 4a3 (fifth process).

The above winding method stabilizes introduction of the magnet wire 18 to the open slot 19 via the uniform clearance t between the side plates 16c and the side formers 16b when the pole tooth 4a around which the coil 5 is formed is clamped by the pair of center formers 16a of the wire winding machine 15, so the center former 16a does not rattle even when the flyer 20 rotates and the coils 5 can be formed uniformly around the pole teeth 4a and 14a. Accordingly, the productivity of winding work for an asymmetric core is improved and the defective ratio is reduced.

Figure 8A:
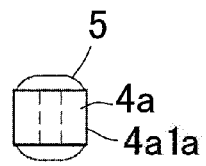
FIG. 8A is a comparative explanatory diagram illustrating the winding states of coils formed around pole teeth having different shapes that depend on presence or absence of the guide core.
Figure 8C:
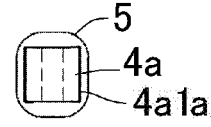
FIG. 8C is a comparative explanatory diagram illustrating the winding states of coils formed around pole teeth having different shapes that depend on presence or absence of the guide core.
Figure 8E:
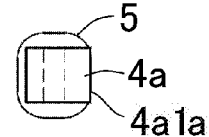
FIG. 8E is a comparative explanatory diagram illustrating the winding states of coils formed around pole teeth having different shapes that depend on presence or absence of the guide core.
Figure 8B:
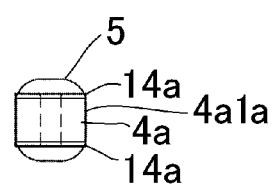
FIG. 8B is a comparative explanatory diagram illustrating the winding states of coils formed around pole teeth having different shapes that depend on presence or absence of the guide core.
Figure 8D:
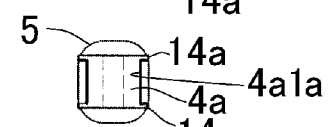
FIG. 8D is a comparative explanatory diagram illustrating the winding states of coils formed around pole teeth having different shapes that depend on presence or absence of the guide core.
Figure 8F:
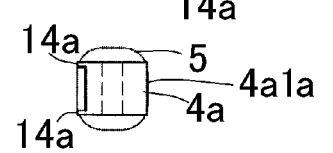
FIG. 8F is a comparative explanatory diagram illustrating the winding states of coils formed around pole teeth having different shapes that depend on presence or absence of the guide core.
Figure 9:
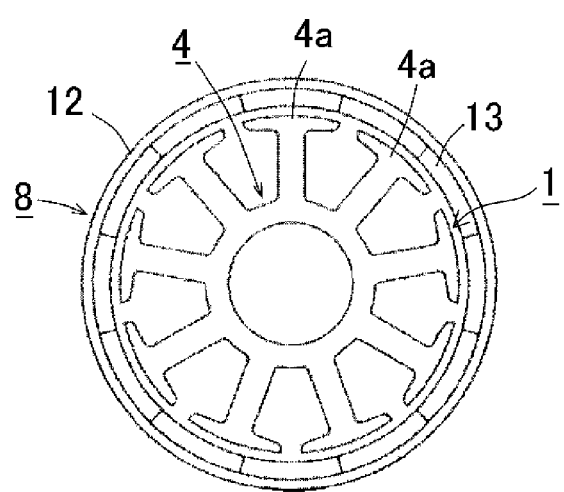
FIG. 9 is an explanatory diagram illustrating the disposition structure of a stator core having symmetric tooth tips and a rotor.

FIGS. 8A and 8B illustrate the winding states of coils that depend on presence or absence of the guide core 14 when the tooth tips 4a1a of the pole teeth 4a of the stator core 4 are symmetric. FIGS. 8C and 8D illustrate the winding states of coils that depend on presence or absence of the guide core 14 when the tooth tips 4a1a of the pole teeth 4a of the stator core 4 are symmetric, but the length in the circumferential direction is small. FIGS. 8E and 8F illustrates the winding states of coils that depend on presence or absence of the guide core 14 when the tooth tips 4a1a of the pole teeth 4a of the stator core 4 are asymmetric.

When the tooth tips 4a1a of the pole teeth 4a of the stator core 4 are symmetric as illustrated in FIGS. 8A and 8B, the coil can be formed without changing the winding state regardless of whether the guide core 14 is present. However, when the tooth tips 4a1a of the pole teeth 4a are symmetric, but the length in the circumferential direction is small as illustrated in FIG. 8C, the tooth tip 4a1a cannot be clamped by the side plates 16c (see FIG. 6B), so the center former 16a rattles as the flyer 20 rotates, a clearance is generated between the coil 5 and the pole tooth 4a, and the coil cannot be formed with a predetermined winding diameter. In contrast, when the pair of guide cores 14 is laminated with the stator core 4 as illustrated in FIG. 8D, since the pole teeth 14a are formed at regular intervals so as to be symmetric with respect to the shaft lines in the radial direction, the tooth tip 14a1 (see FIG. 4) can be clamped by the side plates 16c. Accordingly, the center former 16a does not rattle even when the flyer 20 rotates and stable winding can be performed.

In addition, when the center former 16a is used with the width of the asymmetric pole tooth 4a as illustrated in FIG. 8E, the clearance d is generated between the tooth tip 4a1a and the side plate 16c as illustrated in FIG. 6B and the center former 16a rattles as the flyer 20 rotates. Accordingly, since the magnet wire 18 is guided by the center former 16a and wound around the pole tooth 4a, stable winding cannot be performed.

In contrast, when the pair of guide cores 14 is laminated with the stator core 4 as illustrated in FIG. 8F, since the pole teeth 14a are formed at regular intervals so as to be symmetric with respect to shaft lines in the radial direction, the tooth tips 14a1 (see FIG. 4) can be clamped by the side plates 16c. Accordingly, the center former 16a does not rattle even when the flyer 20 rotates and stable winding can be performed.

In addition, the above three-phase DC brushless motor is used as a driving source to hold the rotor in HVAC (heating, ventilation, and air conditioning) devices or the like in a predetermined position.

In addition, although an outer rotor type brushless motor is used in the above example, the invention is applicable to an inner rotor type brushless motor by exchanging the positions of the rotor magnets and the stator core.

What is claimed is:

1. A brushless motor comprising:
  a stator having a stator core provided with a plurality of stator pole teeth around which coils are formed; and
  a rotor having a rotor shaft rotatably supported via a bearing, the rotor shaft being provided at the center of a rotor yoke having a plurality of rotor magnets facing the stator pole teeth,
  wherein the stator core has a plurality of first pole teeth, a plurality of second pole teeth, and a plurality of third pole teeth disposed in the circumferential direction so as to project in the radial direction from an annular part;
  each of the first pole teeth have a respective tooth tip formed symmetrically with respect to the shaft line in the radial direction;
  each tooth of the second pole teeth and each tooth of the third pole teeth are adjacent to a respective one of the teeth of the first pole teeth in the circumferential direction and have respective tooth tips asymmetrically with respect to the shaft lines in the radial direction;
  a clearance between the tooth tips of each of the second pole teeth and each of the third pole teeth is smaller than (i) a clearance between the tooth tips of each the first pole teeth and the tooth tip of each of the second pole teeth and (2) a clearance between the tooth tips of each of the first pole teeth and the tooth tip of each of the third pole teeth;

the stator core has a guide core having pole teeth provided with tooth tips symmetric with respect to shaft lines in a radial direction, a distance between the adjacent tooth tips is uniform, and the guide core is assembled integrally to the stator core by laminate-pressing electromagnetic steel plates.

2. The brushless motor according to claim 1, wherein a pair of guide cores is laminated with and assembled integrally to both ends in a lamination direction of the stator core.

\* \* \* \* \*